(12) United States Patent
Müller

(10) Patent No.: US 12,240,553 B2
(45) Date of Patent: Mar. 4, 2025

(54) FRAME LOCK

(71) Applicant: ABUS August Bremicker Söhne KG, Wetter-Volmarstein (DE)

(72) Inventor: Thomas Müller, Bischoffen (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 259 days.

(21) Appl. No.: 17/751,712

(22) Filed: May 24, 2022

(65) Prior Publication Data
US 2022/0379985 A1 Dec. 1, 2022

(30) Foreign Application Priority Data
Jun. 1, 2021 (DE) .......................... 102021114205.9

(51) Int. Cl.
*B62H 5/14* (2006.01)
*E05B 71/00* (2006.01)

(52) U.S. Cl.
CPC ............. *B62H 5/147* (2013.01); *E05B 71/00* (2013.01)

(58) Field of Classification Search
CPC .......... E05B 71/00; E05B 67/22; E05B 67/28; B62H 5/147; B62H 5/142
See application file for complete search history.

(56) References Cited

U.S. PATENT DOCUMENTS

| | | | |
|---|---|---|---|
| 438,526 A * | 10/1890 | Butler ..................... | B62H 5/142 70/227 |
| 2,647,390 A * | 8/1953 | Paulson ................. | B62H 5/147 70/227 |

(Continued)

FOREIGN PATENT DOCUMENTS

| | | | |
|---|---|---|---|
| CN | 1924272 A | * 3/2007 | ......... E05B 47/0012 |
| CN | 102979386 A | * 3/2013 | ............. B62H 5/147 |

(Continued)

OTHER PUBLICATIONS

CN 205382801 U, Jun. 13, 2016, PE2E machine translation (Year: 2024).*
NL 1040142 A, Oct. 7, 2013, PE2E machine translation (Year: 2024).*
CN 106837015 Espacenet machine translation description and claims (Year: 2024).*

(Continued)

*Primary Examiner* — Christine M Mills
*Assistant Examiner* — Steven A Tullia
(74) *Attorney, Agent, or Firm* — Dickinson Wright PLLC

(57) ABSTRACT

A frame lock for a two-wheeler comprises a lock body, which comprises a latch and a rotary hoop arrangement having a rotary hoop and a strip. The rotary hoop extends along a circular path, has a blocking structure comprising an abutment section, and is adjustable relative to the lock body along the circular path between an open position, in which the rotary hoop releases a wheel of the two-wheeler for a rotation, and a closed position in which the rotary hoop blocks the wheel against rotation. The latch is adjustable between an unlocked position and a locked position and, when the rotary hoop is in its closed position and the latch is in its locked position, the latch engages behind the abutment section, whereby it blocks the rotary hoop against an adjustment into the open position. The strip is arranged at the rotary hoop, extends along the circular path, and is configured such that it covers the rotary hoop along a part of a longitudinal extent of the rotary hoop and at least regionally over more than 180° of a periphery of the rotary hoop.

21 Claims, 4 Drawing Sheets

(56) References Cited

U.S. PATENT DOCUMENTS

| | | | |
|---|---|---|---|
| 9,932,759 B2 * | 4/2018 | Mohamed | E05B 45/06 |
| 10,450,021 B2 * | 10/2019 | Anuth | B62H 5/147 |
| 11,066,117 B2 * | 7/2021 | Hu | B62H 5/00 |
| 11,299,916 B2 * | 4/2022 | Hentschel | E05B 71/00 |
| 11,401,736 B2 * | 8/2022 | Hu | G07C 9/00 |
| 11,414,894 B2 * | 8/2022 | Müller | B62H 5/147 |
| 2019/0368223 A1 * | 12/2019 | Liu | E05B 15/16 |
| 2022/0379985 A1 * | 12/2022 | Muller | B62H 5/147 |
| 2023/0106700 A1 * | 4/2023 | Lin | B62H 5/003 70/233 |
| 2024/0101205 A1 * | 3/2024 | Shettigar | E05B 67/003 |
| 2024/0102316 A1 * | 3/2024 | Stunnebrink | E05B 67/38 |

FOREIGN PATENT DOCUMENTS

| | | | | |
|---|---|---|---|---|
| CN | 105569464 A * | 5/2016 | | E05B 71/00 |
| CN | 205382801 U * | 7/2016 | | E05B 71/00 |
| CN | 105936307 A * | 9/2016 | | B62H 5/003 |
| CN | 106837015 A * | 6/2017 | | B62H 5/147 |
| CN | 107288438 A * | 10/2017 | | |
| CN | 107476679 A * | 12/2017 | | |
| CN | 107869282 A * | 4/2018 | | E05B 15/00 |
| CN | 207268115 U * | 4/2018 | | E05B 47/00 |
| CN | 108286381 A * | 7/2018 | | |
| CN | 108343323 A * | 7/2018 | | B62H 5/147 |
| CN | 208236113 U * | 12/2018 | | |
| CN | 208251864 U * | 12/2018 | | E05B 71/02 |
| CN | 208380300 U * | 1/2019 | | B62H 5/147 |
| CN | 109538020 A * | 3/2019 | | E05B 45/061 |
| CN | 209413552 U * | 9/2019 | | |
| CN | 110318601 A * | 10/2019 | | E05B 15/00 |
| CN | 110318602 A * | 10/2019 | | E05B 15/00 |
| CN | 111197436 A * | 5/2020 | | |
| CN | 214035174 U * | 8/2021 | | B62H 5/148 |
| CN | 112031557 B * | 5/2022 | | B62H 5/148 |
| DE | 2604732 A * | 8/1977 | | B62H 5/147 |
| DE | 3912900 A1 * | 4/1989 | | E05B 67/28 |
| DE | 202004002499 U1 * | 6/2004 | | B62H 5/147 |
| DE | 202004014503 U1 * | 3/2005 | | B62H 5/147 |
| DE | 102005041268 A1 | 3/2007 | | |
| DE | 602005000354 T2 * | 10/2007 | | B62H 5/147 |
| DE | 102008020950 A1 * | 10/2009 | | B62H 5/147 |
| DE | 202009002004 U1 * | 11/2009 | | B62H 5/147 |
| DE | 202014006369 U1 | 10/2014 | | |
| DE | 102015005419 A1 * | 11/2016 | | B62H 5/003 |
| DE | 102015113082 A1 * | 2/2017 | | B62H 5/147 |
| DE | 102016125320 A1 * | 6/2018 | | B62H 5/147 |
| DE | 102018126356 A1 | 1/2020 | | |
| DE | 202020106957 U1 | 10/2021 | | |
| EP | 550795 A1 * | 7/1993 | | B62H 5/147 |
| EP | 0728659 A1 * | 8/1996 | | B62H 5/147 |
| EP | 1418302 A1 * | 5/2004 | | B62H 5/003 |
| EP | 1834864 A1 * | 9/2007 | | B62H 5/003 |
| EP | 2357123 A2 * | 8/2011 | | B62H 5/147 |
| EP | 2962918 A1 * | 1/2016 | | B62H 5/147 |
| EP | 3064419 A1 * | 9/2016 | | B62H 5/003 |
| EP | 3130729 A1 * | 2/2017 | | B62H 5/147 |
| EP | 3566933 A1 * | 11/2019 | | B62H 5/003 |
| JP | 2506510 Y2 * | 11/1989 | | E05B 71/00 |
| JP | 2001073613 A * | 3/2001 | | |
| JP | 2010180598 A * | 8/2010 | | B62H 5/003 |
| JP | 2019094619 A * | 6/2019 | | B62H 5/00 |
| NL | 8100057 A * | 4/1981 | | B62H 5/147 |
| NL | 0083798 A1 * | 12/1982 | | B62H 5/147 |
| NL | 8303428 A * | 5/1984 | | B62H 5/147 |
| NL | 8300938 A * | 10/1984 | | B62H 5/147 |
| NL | 2000149 C2 * | 1/2008 | | B62H 5/147 |
| NL | 2003230 A * | 7/2009 | | B62H 5/147 |
| NL | 2004606 A * | 4/2010 | | E05B 71/00 |
| NL | 1040142 A * | 4/2013 | | B62H 5/147 |
| NL | 2013132 B1 * | 8/2016 | | B62H 5/147 |
| SE | 437001 B * | 1/1981 | | B62H 5/147 |
| TW | 201700330 A * | 1/2017 | | B62H 5/003 |
| TW | 567725 U * | 10/2018 | | B62H 5/00 |
| WO | WO-2019098180 A1 * | 5/2019 | | B62H 5/00 |

OTHER PUBLICATIONS

DE 2604732 Espacenet machine translation description and claims (Year: 2024).*

* cited by examiner

FRAME LOCK

CROSS-REFERENCE TO RELATED APPLICATIONS

This application claims the benefit and priority of German Application No. DE 102021114205.9 filed on Jun. 1, 2021. The entire disclosure of the above application is incorporated herein by reference.

FIELD

The invention relates to a frame lock for a two-wheeler.

BACKGROUND

Frame locks typically differ from portable two-wheeler locks in that they are fixedly and usually permanently connected to the frame of the two-wheeler, for example screwed to the frame. In this respect, the frame lock is arranged such that a hoop of the frame lock may be selectively adjusted into a position in which it engages between the spokes of a wheel of the two-wheeler to prevent travel with the two-wheeler in this manner. The hoop is expediently secured in this position by a latch of the frame lock that at least ideally may be adjusted solely via a lock cylinder or another locking device of the frame lock for whose actuation a user has to have a secret code such as a key. Typical designs for the hoop are, on the one hand, a configuration as a pivot hoop having a straight course and, on the other hand, a configuration as a rotary hoop having an arcuate course.

A frame lock may in particular comprise a lock body, which comprises a latch, and a rotary hoop that extends along a circular path and that is adjustable relative to the lock body along the circular path between an open position, in which said rotary hoop releases a wheel of the two-wheeler for a rotation, and a closed position in which said rotary hoop blocks the wheel against rotation, wherein the rotary hoop has a blocking structure comprising an abutment section, wherein the latch is adjustable between an unlocked position and a locked position, and wherein, when the rotary hoop is in its closed position and the latch is in its locked position, the latch engages behind the abutment section and thereby blocks the rotary hoop against an adjustment into the open position.

The stability of the rotary hoop is a decisive factor for the reliability of the frame lock. So that the frame lock may as far as possible not be broken open, the rotary hoop has to be particularly strong. At the same time, it is endeavored to be able to manufacture the rotary hoop as cost-effectively as possible and in a largely automated manner as far as possible. In this respect, the rotary hoop is preferably formed from a particularly hard and strong material, for example from a hardened metal. The rotary hoop may in particular be manufactured from a bar material such as a metal wire.

To be adjustable relative to the lock body, the rotary hoop may be at least partly received in a housing of the lock body, in particular in a rotary hoop receiver formed therein, and may be movably supported therein. In this respect, the rotary hoop receiver simultaneously serves to guide the rotary hoop such that the latter may at least substantially be adjusted solely along the circular path. In particular due to the blocking structure formed at the rotary hoop, the rotary hoop may have elevated portions and/or depressions along its longitudinal extent such that, under certain circumstances, the rotary hoop may not, or may only in part regions of its longitudinal extent, areally contact an inner wall of the rotary hoop receiver and be guided thereat. To avoid a canting or jamming of the rotary hoop in the rotary hoop receiver, a certain clearance is furthermore usually provided between the outer periphery of the rotary hoop and the inner periphery of the rotary hoop receiver. For these reasons, the rotary hoop may often make smaller movements transverse to its longitudinal extent in the rotary hoop receiver and may impact margins of the rotary hoop receiver in so doing. This may in particular occur during a trip with the two-wheeler at which the frame lock is mounted and may then lead to perceptible and disturbing rattling noises.

To be able to actuate the rotary hoop, that is to be able to manually adjust it between its open position and its closed position, a handle is typically provided at the frame lock and is fastened to the rotary hoop. The handle may extend outwardly from the frame lock such that it may be grasped and may be moved about the center of the circular path in order thereby to adjust the rotary hoop in a corresponding manner along the circular path. In this respect, the handle or a fastening lug to which the handle may be fastened may, for example, be welded to the rotary hoop for a stable connection to the rotary hoop. Alternatively thereto, the handle or the fastening lug may also be screwed to the rotary hoop. However, such types of fastening to the rotary hoop may lead to an impairment of the material structure and thus of the mechanical stability of the rotary hoop.

SUMMARY OF THE INVENTION

It is an object of the invention to provide a frame lock for a two-wheeler or a frame lock system comprising a frame lock that is low-noise, whose rotary hoop is particularly stable and can be easily actuated in this respect, that is also flexibly usable, and that may be manufactured in a largely automated manner as far as possible.

The object is satisfied by a frame lock and by a frame lock system as explained in the following.

The frame lock in accordance with the invention for a two-wheeler comprises a lock body, which has a latch, and a rotary hoop arrangement that comprises a rotary hoop and a strip. In this respect, the rotary hoop extends along a circular path and is adjustable relative to the lock body along the circular path between an open position, in which said rotary hoop releases a wheel of the two-wheeler for a rotation, and a closed position in which said rotary hoop blocks the wheel against rotation.

The rotary hoop is preferably composed of metal, whereas the strip is preferably composed of plastic. The rotary hoop is preferably formed from a bar material, in particular from a metal wire such as steel wire, wherein the bar material preferably has a constant cross-section, in particular a circular cross-section. This cross-section may be a normal cross-section of the rotary hoop which the rotary hoop has along a large part of its longitudinal extent and/or at least along a blocking section that is arranged outside the lock body, in particular outside a housing of the lock body, of the frame lock in the closed position of the rotary hoop such that, in its closed position, the rotary hoop may engage with the blocking section into the wheel of the two-wheeler and may thereby block it against rotation. The diameter of the circular path may e.g. be in the range between 10 cm to 15 cm and may, for example, amount to approximately 13 cm. In cross-section, the rotary hoop may have a diameter in the order of a few millimeters to a few centimeters. For example, the diameter of the cross-section may at least on average amount to approximately 8 or 9 mm. Due to the extent along the circular path, the rotary hoop has an arcuate shape that extends over a specific part region of the circularly closed circular path, for example over an angular range of at least 200° and/or at most 250°, preferably of at least 210° and/or at most 240°, in particular of approximately 225° or 230°.

Since the rotary hoop is adjustable between the open position and the closed position, the rotary hoop may be adjusted from the open position in a closing direction up to and into the closed position and vice versa from the closed position in an opening direction opposite the closing direction up to and into the open position. However, it is thereby not ruled out that the rotary hoop may also be adjustable in another manner, in particular in the closing direction beyond the closed position and/or in the opening direction beyond the open position.

On an adjustment of the rotary hoop along the circular path, the rotary hoop is displaced along the circular path with its arcuate longitudinal extent such that it does not leave the circular path, but only extends over a part region of the circular path—that is changed with respect to its position, but not with respect to its angular extent. The adjustment of the rotary hoop in this respect corresponds to a rotation of the rotary hoop about an axis of rotation that extends through the center of the circular path and that is oriented perpendicular to a plane in which the circular path is disposed.

The adjustability of the rotary hoop along the circular path is a basic adjustability that may in particular result from a corresponding support of the rotary hoop at the lock body. However, the adjustability does not have to be permanently present, but may be blocked by said latch, in particular to be able to secure the rotary hoop in one or more different specific positions by means of the latch. The rotary hoop may preferably be adjusted at least from the open position up to and into the closed position as well as from the closed position up to and into the open position if neither the latch nor any obstacle in the movement path (for example, a spoke of the wheel of the two-wheeler) blocks an adjustment.

The circular path may extend partly through the lock body of the frame lock such that the rotary hoop may extend partly into or through the lock body and may in this respect cooperate with the latch within the lock body. In this respect, the latch is preferably arranged completely within a housing of the lock body in order to be as inaccessible as possible from the outside. The rotary hoop may furthermore be partly received in the housing of the lock body. The rotary hoop may in particular be at least partly received and movably supported, namely adjustable relative to the lock body between the open position and the closed position, in a rotary hoop receiver formed in the lock body.

In the closed position, the rotary hoop preferably extends out of the lock body, in particular out of said housing of the lock body, and then at least with a free end back into the lock body, in particular into the housing, such that the lock body and the rotary hoop preferably form a closed ring in the closed position. In this way, the respective wheel may be particularly reliably blocked against rotation. In the open position, the rotary hoop, in contrast, extends out of the lock body, but not back into it, or is at least almost completely received in the lock body, in particular in the housing.

In its closed position, the rotary hoop may naturally only block the wheel of a respective two-wheeler against rotation when the frame lock is mounted in a suitable manner at the two-wheeler. In other words: The frame lock is configured to be arranged at the two-wheeler such that the rotary hoop blocks a wheel of the two-wheeler against rotation (in particular by engaging through the wheel) in its closed position and releases the wheel for a rotation in its open position.

In accordance with the invention, the rotary hoop has a blocking structure comprising an abutment section, wherein the latch is adjustable between an unlocked position and a locked position, and wherein, when the rotary hoop is in its closed position and the latch is in its locked position, the latch engages behind the abutment section and thereby blocks the rotary hoop against an adjustment into the open position.

The latch may in particular be adjustable relative to said housing of the lock body between the unlocked position and the locked position. The adjustment may, for example, be a linear displacement. The latch may preferably only be adjusted via a locking device which is provided at the lock body, in particular in the lock body, preferably in the form of a lock cylinder, to which the latch is coupled, e.g. via an entrainer, and which may only be actuated by means of a key associated with it.

The adjustability of the latch is also a basic adjustability that does not have to be permanently present, but that may in particular depend on the respective position of the rotary hoop. The latch may preferably be adjusted from the unlocked position up to and into the locked position and vice versa from the locked position up to and into the unlocked position at least when the rotary hoop is in its closed position. Furthermore, the latch may in particular also be adjusted from the unlocked position up to and into the locked position and vice versa from the locked position up to and into the unlocked position when the rotary hoop is in its open position.

Thus, the rotary hoop may be secured in its closed position by the latch in that the latch is adjusted into its locked position and then engages behind the abutment section of the blocking structure of the rotary hoop. The blocking against an adjustment of the rotary hoop along the circular path is particularly reliable if the abutment section is oriented at least substantially perpendicular to the direction of movement to be blocked, that is to the course of the circular path, of the rotary hoop, which is therefore preferred.

The abutment section is preferably, but not necessarily, formed as an abutment surface, i.e. as areal. The abutment section may generally also be formed by an edge or a contour of the blocking structure.

The blocking structure may be formed in many different ways. A generally conceivable way is that the blocking structure comprises a cut or a cut-out in the rotary hoop, wherein the cut or the cut-out may in particular extend radially from the outside to the inside into the rotary hoop with respect to the center of the circular path. The abutment section may in this respect be formed as a side wall of such a cut or such a cut-out. However, the abutment section may also be formed by a side wall of a structure projecting from the rotary hoop.

The blocking structure may have a plurality of abutment sections that may each be engaged behind by the latch in order to secure different positions of the rotary hoop against a departure from the respective position in at least one adjustment direction. A plurality of the abutment sections may in this respect serve for the securing of the same position, either with respect to the same adjustment direction or mutually opposite adjustment directions.

Said engagement behind the abutment section by the latch is to be understood in relation to the adjustment of the rotary hoop to be blocked. In this respect, the latch in particular engages transversely to the course of the circular path into a movement path of the abutment section which the abutment section would pass through if the latch were in its unlocked position and the rotary hoop were adjusted along the circular path in the adjustment direction to be blocked.

When the rotary hoop is in its closed position and the latch is in its locked position, the latch preferably contacts the abutment section or at least has an only small spacing, for example of less than 1 mm, in particular of a few hundred micrometers, from the abutment section. The rotary hoop is thereby advantageously secured against departing from the closed position at all in the direction of the open position. In general, the latch may, however, also have a larger spacing from the abutment section such that the rotary hoop may indeed be adjusted from the closed position by a distance corresponding to this spacing, but is in any case blocked against reaching a position in which the rotary hoop would no longer reliably block the wheel against a rotation.

In addition to the rotary hoop, the rotary hoop arrangement comprises said strip. In accordance with the invention, this strip is arranged at the rotary hoop, extends along the circular path, and is configured such that it covers the rotary hoop along at least a part of its longitudinal extent and at least a part of its periphery.

In this respect, the strip is in particular arranged at the rotary hoop such that it is adjusted together with the rotary hoop on an adjustment of the rotary hoop. The rotary hoop arrangement formed by the rotary hoop and the strip forms a functional unit of the frame lock in this regard. The rotary hoop and the strip, at least after the strip has been arranged at the rotary hoop during the assembly of the frame lock, may only be moved together, i.e. without a relative movement with respect to one another.

Therefore, respective positions of the rotary hoop simultaneously also represent corresponding positions of the strip and of the total rotary hoop arrangement. In the open position of the rotary hoop, the strip and the rotary hoop arrangement as a whole are in particular also in an open position and, in the closed position of the rotary hoop, the strip and the rotary hoop arrangement as a whole are in particular also in a closed position and are adjustable between these positions.

Since the strip covers the rotary hoop along at least a part of its longitudinal extent, the strip extends in a corresponding manner to the rotary hoop along said circular path. The strip may thus in particular have an at least substantially arcuate course along which it may at least sectionally have a constant cross-section.

Along the circular path, the strip may, for example, extend over at least 120° and/or at most 150°, in particular over approximately 135°. The longitudinal extent of the strip, i.e. its extent along the circular path, may in particular be restricted to a support section that is arranged within the lock body, in particular within a housing of the lock body, both in the closed position of the rotary hoop and in the open position of the rotary hoop (and also in all the positions therebetween). In this respect, the strip preferably extends in said opening direction up to the corresponding end of the rotary hoop. In the opposite closing direction, the strip preferably extends over at least a large part of the support section. The strip may in particular at least substantially extend over the total support section.

In this respect, the strip not only extends along the circular path, but also in a peripheral direction around the course of the circular path and thus covers at least a part of the periphery of the rotary hoop, wherein this periphery is related to the respective cross-section of the rotary hoop in an orthogonal plane to the course of the circular path. In this way, the strip may engage around the rotary hoop, in particular more or less far depending on the position along its longitudinal extent. This may contribute to a particularly stable arrangement of the strip at the rotary hoop.

To cover the rotary hoop, the strip may contact, in particular areally contact, the rotary hoop in the regions in which it covers the rotary hoop. Due to the covering, the strip may represent protection for the rotary hoop, for example, against mechanical impairment, against dirt, and/or against moisture. Furthermore, free spaces between the rotary hoop and one or more inner walls of the rotary hoop receiver of the lock body, in which the rotary hoop arrangement may be at least partly received and movably supported, may be filled by the strip such that, via the strip, the rotary hoop is guided largely without clearance within the rotary hoop receiver and rattling noises may thereby be avoided. The design of the strip from plastic may also contribute to this, said plastic may in particular be selected or formed with respect to its elasticity and/or surface properties such that the strip may slide easily along a respective inner wall of the rotary hoop receiver. The strip may furthermore serve to connect the rotary hoop to a handle, as will be explained further below.

Due to these different functions, the strip may in particular also be designated as a "cover", a "rail", in particular a "guide rail", or a "connector".

In accordance with the invention, provision is further made that the strip extends over more than 180°, preferably over at least 210°, in particular over approximately 225°, in a peripheral direction around the rotary hoop.

Said angular range is defined with respect to a center of a cross-section of the rotary hoop that preferably corresponds to the area center of gravity of this cross-section. The cross-section may in particular be the cross-section of the rotary hoop at the respective position along the longitudinal extent of the rotary hoop or said normal cross-section of the rotary hoop that may have to be conceptually continued up to the respective position along the circular path, if necessary. The cross-section may in particular be circular.

The strip at least overall has said extent in the peripheral direction, i.e. the strip does not necessarily at a single position along its longitudinal extent have to extend over said angular range in the peripheral direction around the rotary hoop, but may at one position extend the furthest in the one peripheral direction and at another position extend the furthest in the opposite peripheral direction, wherein these extents include an angle between them that amounts to more than 180°, preferably at least 210°, in particular approximately 225°.

In one or more part regions of its longitudinal extent, the strip, however, preferably extends along the total respective part region over more than 180°, preferably over at least 210°, in particular over approximately 225°, in the peripheral direction around the rotary hoop. In other words, it applies for every position along the longitudinal extent of the strip that lies within a respective one of these part regions that, at this position, the strip extends over said angular range in the peripheral direction around the rotary hoop.

Said part regions in which the strip extends over more than 180°, preferably over at least 210°, in particular over approximately 225°, in the peripheral direction around the rotary hoop preferably together have a length (i.e. an extent along the circular path) that is greater than half of the longitudinal extent of the strip. It is in particular preferred for the longest of these part regions to extend over more than half of the longitudinal extent of the strip.

In general, the covering of the rotary hoop by the strip may have interruptions in the peripheral direction, i.e. it may be distributed over a plurality of separate sections that together extend over more than 180°, preferably over at least 210°, in particular over approximately 225°, of the periphery of the rotary hoop. However, the rotary hoop is preferably covered by a section of the strip that is continuous in the peripheral direction, i.e. that is free of interruptions, over said angular range.

Since the strip extends over more than 180° in the peripheral direction around the rotary hoop and thus covers the rotary hoop over more than half of its periphery, the rotary hoop is engaged around from at least three sides. In other words, the strip thus covers the rotary hoop at least with respect to three directions of which two are oriented opposite one another and the third is oriented perpendicular thereto, wherein the directions are oriented transversely to the longitudinal extent of the strip or of the rotary hoop and may in particular be oriented radially to said center of the cross-section of the rotary hoop. Due to such an engagement around, the strip may be particularly reliably arranged at the rotary hoop. Furthermore, the strip may in this way support the rotary hoop over a large part of its periphery with respect to said rotary hoop receiver such that the rotary hoop is particularly reliably guided in the rotary hoop receiver.

In accordance with an advantageous embodiment, the strip covers the rotary hoop at least regionally in a direction perpendicular to a plane of the circular path, at least regionally in a direction opposite thereto, and at least regionally in a direction facing a center of the circular path or facing away therefrom. The regions in which the strip covers the rotary hoop in one of said directions may overlap along the circular path. The rail preferably covers the rotary hoop in one or more part regions, in particular in the above-mentioned part regions, of its longitudinal extent in all three directions. In this respect, a covering in a specific direction is to be understood such that the strip is arranged adjoining the rotary hoop in this direction such that it covers said rotary hoop viewed from this direction. In this respect, it is preferred for the strip to contact, in particular areally contact, the rotary hoop along the longitudinal extent of the strip at least where the strip covers the rotary hoop.

In part regions of its longitudinal extent in which the strip covers the rotary hoop both in a direction perpendicular to the plane of the circular path and in a direction opposite thereto as well as in a direction facing the center of the circular path or facing away therefrom, the covering may be mirror-symmetrical with respect to a plane of the circular path. The strip may in particular be mirror-symmetrical with respect to this plane in these part regions or also along its total longitudinal extent, possibly with the exception of at least one end section of its longitudinal extent.

Furthermore, the strip may have a U-shaped or C-shaped cross-section (perpendicular to the course of the circular path), preferably an at least substantially constant U-shaped or C-shaped cross-section, in these part regions or also along its total longitudinal extent, possibly with the exception of at least one end section of its longitudinal extent. In this respect, the open side of the U shape or C shape is preferably oriented facing in a radial direction, in particular radially outwardly, with respect to the center of the circular path.

In accordance with an advantageous embodiment, the strip is formed as a dimensionally stable and/or elastic part separate from the rotary hoop. For this purpose, a plastic is in particular suitable as the material of the strip, wherein the plastic may be formed into the shape of the strip by injection molding, for example.

In accordance with a further advantageous embodiment, the strip is fastened in a form-fitting manner to the rotary hoop. In this respect, the form fit is in particular present in all the spatial directions such that there is no direction in which the strip may be moved relative to the rotary hoop, at least not without the strip having to be deformed for this purpose. The form-fitting fastening may overall be provided over at least 80% of the longitudinal extent of the strip. In this respect, the form-fitting fastening does not necessarily have to extend solely over a single continuous part region of the longitudinal extent, but it may also be distributed over a plurality of separate part regions The strip is preferably fastened in a latching manner, i.e. by an elastically reversible form fit, to the rotary hoop. For example, the strip may be connected to the rotary hoop in the manner of a snap-on connection. In this respect, it is necessary for the fastening of the strip to the rotary hoop to at least slightly elastically deform, in particular widen, the strip, which has a corresponding elasticity, in order to arrange said strip at the rotary hoop, whereupon the elasticity at least largely reverses the deformation again such that the strip then engages around the rotary hoop in a form-fitting manner, namely over more than half of its periphery. The temporary widening and the subsequent engagement around along the longitudinal extent of the strip may in particular take place everywhere the strip extends in the peripheral direction over more than half of the periphery of the rotary hoop.

In addition to said form fit, the strip may at least regionally also contact the rotary hoop in a force-fitting manner. In this respect, sections of the strip may be preloaded against the rotary hoop, in particular due to said elasticity of the strip. Due to an additional force fit, the fastening of the strip to the rotary hoop is improved further.

The advantages of a form-fitting fastening, in particular a latching fastening, of the strip to the rotary hoop also result independently of the angular range over which the strip extends in the peripheral direction around the rotary hoop. The form fit in particular contributes towards ensuring that the strip is reliably arranged at the rotary hoop such that the rotary hoop may, via the strip, be supported in and slidingly guided in a particularly low-interference manner in the rotary hoop receiver. In this regard, the invention also relates, irrespectively of the measure of the extent of the strip in the peripheral direction around the rotary hoop, to a frame lock for a two-wheeler comprising a lock body, which comprises a latch, and a rotary hoop arrangement that comprises a rotary hoop, preferably composed of metal, and a strip, preferably composed of plastic, wherein the rotary hoop extends along a circular path and is adjustable relative to the lock body along the circular path between an open position, in which said rotary hoop releases a wheel of the two-wheeler for a rotation, and a closed position in which said rotary hoop blocks the wheel against rotation, wherein the rotary hoop has a blocking structure comprising an abutment section, wherein the latch is adjustable between an unlocked position and a locked position, wherein, when the rotary hoop is in its closed position and the latch is in its locked position, the latch engages behind the abutment section and thereby blocks the rotary hoop against an adjustment into the open position, wherein the strip is arranged at the rotary hoop, extends along the circular path, and is configured such that it covers the rotary hoop along at least a part of its longitudinal extent and at least a part of its periphery, and wherein the strip is fastened in a form-fitting manner, in particular in a latching manner, to the rotary hoop. Both the preceding and the following explanations with respect to the above-mentioned frame lock, in particular to its rotary hoop arrangement, and the descriptions of different possibilities for the design of the frame lock also apply to the present frame lock, insofar as applicable. Not only embodiments of the above-mentioned frame lock, but also advantageous embodiments of the present frame lock in particular result from the features of the dependent claims.

In accordance with an advantageous embodiment of the frame lock in accordance with the invention, an end section of the rotary hoop and a corresponding end section of the strip form a pivot connection that has a pin that extends along a longitudinal axis perpendicular to the plane of the circular path, wherein the strip is pivotable about the longitudinal axis of the pin relative to the rotary hoop. The end section of the rotary hoop comprises one of the two ends of the longitudinal extent of the rotary hoop and extends from this end along the circular path over a certain distance. The corresponding end section of the strip comprises one of the two ends of the longitudinal extent of the strip, namely that one which corresponds with respect to its orientation along the circular path to said end of the rotary hoop, and extends from this end along the circular path over a certain distance. The distances over which the end section of the rotary hoop and the corresponding end section of the strip extend may each have a length of a few millimeters, for example a length of at most 15 mm, preferably at most 10 mm, and/or a length of at most 10%, preferably at most 5%, of the longitudinal extent of the rotary hoop. This distance is preferably equally long for the end section of the rotary hoop and the corresponding end section of the strip.

The longitudinal axis along which the pin extends may in particular be an axis of symmetry of the pin. The pin may at least substantially have a cylindrical shape, wherein the longitudinal axis is then the cylinder axis of the cylindrical shape. The cross-section of the pin perpendicular to the longitudinal axis is at least regionally constant, preferably over the total length (i.e. an extent along the longitudinal axis) of the pin—possibly with the exception of a free end of the pin that may in particular have a chamfer.

The longitudinal axis of the pin is preferably oriented perpendicular to the plane of the circular path along which the rotary hoop extends. On a pivoting of the strip about the longitudinal axis of the pin relative to the rotary hoop, the strip may therefore be pivoted in an at least approximately radial direction against the rotary hoop with respect to the center of the circular path in order to be arranged at said rotary hoop, in particular fastened in a form-fitting manner. The strip may in particular be configured to be pivoted from an inner space of the circular path to an inner side, i.e. to a side facing radially inwardly (towards the center) with respect to the center of the circular path, of the arcuate shape of the rotary hoop in order to be arranged, in particular fastened in a form-fitting manner, at the rotary hoop.

In accordance with an advantageous embodiment, the form fit between the strip and the rotary hoop may be brought about by pivoting the strip about the longitudinal axis of the pin towards the rotary hoop. The pivot movement may in this respect comprise a latching in, in particular the latching in described further above, of the strip at the rotary hoop. Due to such a design, the advantageous form fit between the strip and the rotary hoop may be brought about in a clearly defined manner.

Conversely, provision may furthermore be made that the form fit between the strip and the rotary hoop may be released again by pivoting the strip about the longitudinal axis of the pin away from the rotary hoop. This may be expedient to be able to replace the strip in a simple manner.

In accordance with a further advantageous embodiment, a hole is formed in the end section of the rotary hoop, wherein the pin is formed at the corresponding end section of the strip and engages into the hole, preferably perpendicular to the plane of the circular path, in particular engages through the hole. Such a design represents a particularly simple type of a pivot connection whose elements may be easily manufactured, in particular also in an automated manner, and may be connected to one another. The pin is preferably integrally formed at the corresponding end section of the strip and/or is connected in a bonded manner to the strip. In general, the pin may, however, also be formed as a separate element and may be fixedly connected to the strip.

Alternatively to this embodiment, provision may also be made that, exactly the other way around, the pin is formed at the end section of the rotary hoop, in particular integrally formed thereat and/or connected in a bonded manner thereto, and, preferably perpendicular to the plane of the circular path, engages into a hole, in particular engages through a hole, wherein the hole is formed in the corresponding end section of the strip.

In accordance with an advantageous embodiment, the frame lock further comprises a spring for preloading the rotary hoop relative to the lock body, wherein the spring is fastened to said pin. The spring is preferably a helical spring, in particular a screw tension spring. The rotary hoop may in particular be preloaded in the opening direction by the spring.

For fastening to the pin, the spring may have an eyelet formed at one end of the spring and may then surround the pin with this eyelet. The pin may in particular first engage through the eyelet of the spring and then engage through said hole or at least engage into it. The eyelet is in this respect advantageously captured between the rotary hoop and the strip such that the coupling of the rotary hoop to the spring is secured in a certain manner by the strip. The eyelet does not necessarily have to be peripherally closed, but it may be sufficient if the eyelet engages around the pin like a round hook at least over a predominant part of its periphery.

The rotary hoop may be permanently fixedly connected to the lock body, in particular a housing of the lock body, via the spring, in particular solely via the spring. For this purpose, the spring may have a further eyelet at its end opposite said eyelet or may be configured in another manner for coupling to the lock body. In its closed position and/or its open position, the rotary hoop may additionally be secured against a release from the lock body via the latch if the latter engages behind a respective abutment section formed at the rotary hoop.

At its end section, the rotary hoop is thus not only pivotally connected to the strip, but is also coupled to the lock body. Advantageously, no additional structure is required for this purpose, but the same structure (pin and hole) may serve both for the design of a pivot connection and for the coupling to the lock body.

In accordance with a further advantageous embodiment, the strip has a handle for manually adjusting the rotary hoop or a fastening lug for fastening such a handle to the strip. The handle or the fastening lug may be fastened to the strip or may be integrally formed, in particular formed in a bonded manner, at the strip, for example molded on. The handle or the fastening lug preferably either projects radially outwardly with respect to the center of the circular path from the strip or projects perpendicular to the plane of the circular path from the strip and may extend in this direction, for example through a slot in the housing of the lock body, out of the rotary hoop receiver. In this way, the handle may adopt a position in which it may be easily gripped and actuated both in the open position and in the closed position of the rotary hoop arrangement.

In accordance with a further advantageous embodiment, the rotary hoop has at least one elevated portion along its longitudinal extent, said elevated portion engaging into a recess of the strip such that (due to this engagement) a form fit is formed between the strip and the rotary hoop with respect to a course of the circular path. Alternatively or additionally thereto, provision may be made that the rotary hoop has at least one recess along its longitudinal extent, into which recess an elevated portion of the strip engages such that (due to this engagement) a form fit is formed between the strip and the rotary hoop with respect to the course of the circular path.

The recess may, for example, be an opening or a cut-out in the strip or in the rotary hoop. Said recess of the strip may in particular be formed as a depression in the strip that extends away from the rotary hoop, i.e. radially outwardly with respect to a center of the cross-section of the rotary hoop, into the strip. Said recess of the rotary hoop may in particular be formed as a depression in the rotary hoop that extends into the rotary hoop, i.e. radially inwardly with respect to a center of the cross-section of the rotary hoop.

The elevated portions and/or recesses possibly provided at the rotary hoop may be part of said blocking structure of the rotary hoop. Depending on the shape, arrangement, and/or orientation of a respective elevated portion or recess, the effect of a form fit brought about by it may be limited to one of the two possible directions along the circular path.

In this respect, the form fit along the circular path may in each case result particularly due to said engagement of a respective elevated portion of the one part (rotary hoop or strip) into a respective recess of the other part. In other words, due to the cooperation of the, if applicable, plurality of elevated portions and recesses, the strip is secured in a form-fitting manner against being displaced relative to the rotary hoop along the circular path. This results in an additional stabilization of the arrangement of the rotary hoop and the strip along the longitudinal extent through a form-fitting engagement into one another. Such a (possibly additional) securing and stabilization of the rotary hoop arrangement may be in particular be expedient since, on an adjustment of the rotary hoop arrangement, frictional forces act on the strip, which slides along the inner sides of the rotary hoop receiver, that could otherwise urge the strip from its correct arrangement at the rotary hoop.

In accordance with a further advantageous embodiment, the blocking structure comprises at least two abutment sections that correspond to the closed position and the open position of the rotary hoop, wherein, when the rotary hoop is in its closed position or its open position and the latch is in its locked position, the latch engages behind the corresponding abutment section and thereby blocks the rotary hoop against an adjustment from the respective position. The one of the two abutment sections in this respect corresponds to the closed position in that, when the rotary hoop is in its closed position and the latch is in its locked position, it is engaged behind by the latch with respect to the course of the circular path such that it may not be guided past the latch in the opening direction and the rotary hoop is thus blocked against an adjustment from the closed position in the direction of the open position. The other of the two abutment sections in this respect corresponds to the open position in that, when the rotary hoop is in its open position and the latch is in its locked position, it is engaged behind by the latch with respect to the course of the circular path such that it may not be guided past the latch in the closing direction and the rotary hoop is thus blocked against an adjustment from the open position in the direction of the closed position.

In this embodiment, the strip preferably extends along the circular path at least between the two abutment sections, i.e. at least from the one of the two abutment sections up to the other. In this respect, the strip may also extend along the circular path beyond one of the two abutment sections or beyond both, but it at least covers the rotary hoop along that part of its longitudinal extent which the two abutment sections enclose between them.

In accordance with an advantageous further development of this embodiment, the blocking structure comprises at least two webs projecting from the rotary hoop, preferably in the same direction, wherein each of the two webs has one of the two abutment sections, i.e. the one web has the one abutment section and the other web has the other abutment section. In this respect, the abutment sections preferably formed directly at the respective web, in particular as the end face of the respective web.

The direction in which the webs project is preferably perpendicular to the longitudinal extent of the rotary hoop, i.e. to the course of said circular path. Since the two webs preferably project in the same direction from the rotary hoop, they may in particular project in parallel with one another from the rotary hoop. However, they may also project in the same direction from the rotary hoop in that they both project in the same radial direction from the rotary hoop with respect to the center of the circular path. The two webs may, for example, both project radially inwardly or both project radially outwardly with respect to the center of the circular path. The two webs preferably both project in the same axial direction, i.e. in a direction perpendicular to the plane of the circular path, from the rotary hoop.

It is not necessary in this respect for the total respective web to project from the rotary hoop, but it is sufficient for the web to partly project from the rotary hoop. A part of the web may also extend into the rotary hoop, in particular transversely to the longitudinal extent of the rotary hoop. The part of the web projecting from the rotary hoop may in particular be a structure that is convex relative to its environment.

The web may, for example, project relative to the cross-section of an adjoining section of the rotary hoop, in particular relative to the cross-section of a bar material from which the rotary hoop is formed, before the blocking structure or at least the web has been formed thereat. In this respect, the web projecting over a cross-section in particular means that the web—viewed along the extent of the rotary hoop along the circular path—extends beyond an outer contour of the cross-section.

The webs thus form a part of the blocking structure with which the latch cooperates to block the rotary hoop against an adjustment from a respective position. For this purpose, the webs are advantageously formed at corresponding positions at the rotary hoop. In other words, the webs are configured such that (in particular arranged such that) the latch engages behind the abutment section of a respective one of the two webs when the rotary hoop is in its closed position or in its open position and the latch is in its locked position.

The webs, in particular the total blocking structure, are preferably arranged within said support section of the rotary hoop, i.e. that section of the longitudinal extent of the rotary hoop that remains within the lock body on an adjustment of the rotary hoop between the closed position and the open position, and are thus advantageously not accessible from the outside.

The strip, which extends along the circular path between the two abutment sections of the two webs, may in this respect in particular contact an outer side of the rotary hoop, which faces in the direction of the projection, from the one of the two webs up to the other of the two webs. In this respect, the strip preferably has a direct contact with this outer side. In general, a certain gap may, however, also at least regionally remain. Furthermore, it is preferred for the strip or at least a section of the strip to extend along an outer contour of the rotary hoop that connects said two webs in a manner following the course of the circular path, in particular in a direct line.

Each of the two webs further has two mutually opposite parallel side surfaces that extend at least substantially along the circular path, wherein the abutment section of the respective web is formed by an end face of the web that connects the side surfaces of the web and that is oriented at least substantially perpendicular to the circular path.

The two side surfaces are in this respect preferably aligned in parallel with that direction in which the web projects from the rotary hoop. In this respect, the webs may extend along the circular path. Depending on the direction in which the web projects from the rotary hoop, the side surfaces may therefore have a course curved in accordance with the circular path. However, rather short webs may in particular also have a straight course tangential to the circular path.

Transverse to the course of the circular path and to the direction of the projection, the side surfaces may, at least in as far as they project from the rotary hoop, be connected to one another by respective margins or marginal sides of the web. The marginal sides may in this respect also comprise said end face by which the abutment section is formed. The marginal sides are preferably oriented at least substantially perpendicular to the side surfaces. This in particular also applies to the end face by which the abutment section is formed. The orientation of the abutment section preferably deviates by at most 10° from an orientation perpendicular to the circular path.

Such a web comprising two parallel side surfaces may be formed comparatively easily and inexpensively by cold forming. In a section of the longitudinal extent of the rotary hoop (or of the material from which the rotary hoop is formed) whose length (of the section) corresponds to the length of the web to be formed, an outer part region of the section may, for example, be pressed from opposite directions between a punch and a support such that the material of this part region is reshaped into a web that projects at least partly outwardly perpendicular to these directions. The two side surfaces of the web are thereby oriented perpendicular to the two opposite directions from which the part region is pressed.

In this embodiment, provision is preferably further made that the strip has a side surface that is at least substantially aligned both with one of the side surfaces of the one of the two webs and with one of the side surfaces of the other of the two webs. In this respect, the strip preferably at least substantially extends from the one of the two webs up to the other. The side surface of the strip may in this respect bound the strip, at least in the region between the two webs, in a peripheral direction around the longitudinal extent of the rotary hoop.

Due to said alignment, the three side surfaces (i.e. the two side surfaces of the two webs and the side surface of the strip) may form a continuous path, possibly apart from a respective gap at the two transitions. In this respect, the three side surfaces may in particular be disposed in one plane or may form a curved path corresponding to the course of the circular path.

In this respect, the side surfaces may in particular face in the direction that corresponds to an adjustment of the latch from its locked position into its unlocked position. The latch may be preloaded in the opposite direction, that is from the unlocked position into its locked position, and, after the latch has been displaced into its unlocked position to release a blocked position of the rotary hoop, the latch may slide along the path formed by the side surfaces preloaded against said path while the rotary hoop is being adjusted. In this way, the latch may be held in its unlocked position, or at least in a position that does not block the rotary hoop, by means of the strip during an adjustment of the rotary hoop.

In accordance with a further advantageous embodiment, the blocking structure has at least a first abutment section facing in a closing direction and a second abutment section facing in an opening direction opposite the closing direction. The closing direction corresponds to the above-mentioned closing direction, in which the rotary hoop is adjusted from its open position into its closed position, and the opening direction corresponds to the above-mentioned opening direction in which the rotary hoop is adjusted from its closed position into its open position. That an abutment section faces in a respective direction in particular means that this direction is aligned in parallel with a surface normal of a surface of the abutment section and leads away from this surface.

The first abutment section facing in the closing direction may in particular be arranged closer along the circular path to said end section of the rotary hoop at which said pivot connection with the strip is formed than the second abutment section facing in the opening direction. The blocking structure may further comprise two webs projecting from the rotary hoop, in particular the two above-mentioned webs, wherein the one of the two webs has the first abutment section and the other of the two webs has the second abutment section.

Provision may furthermore be made that, when the rotary hoop is in its closed position and the latch is in its locked position, the latch engages behind the first abutment section (with respect to the opening direction) and thereby blocks the rotary hoop against an adjustment into the open position and, when the rotary hoop is in its open position and the latch is in a partly locked position between its locked position and its unlocked position, the latch engages behind the second abutment section (with respect to the closing direction) and thereby blocks the rotary hoop against an adjustment into the closed position, wherein the strip is formed in a section of its longitudinal extent adjoining, in particular directly adjoining, the second abutment section in the opening direction such that said strip restricts the adjustability of the latch to an adjustment between the unlocked position and the partly locked position.

In other words, in such an embodiment, in the open position of the rotary hoop, the latch may be adjusted, starting from its unlocked position, in the direction of the locked position only up to and into the partly locked position (and back again from there) due to the restriction of its adjustability by the strip, wherein the partly locked position may particular be disposed approximately centrally between the locked position and the unlocked position. Since the latch already engages behind the second abutment section in the partly locked position (albeit possibly with a smaller overlap), the rotary hoop may nevertheless be blocked in its open position by means of the latch. However, when the rotary hoop is in the open position, the strip prevents an adjustment of the latch into the locked position.

The strip may in particular restrict the adjustability of the latch to an adjustment between the unlocked position and the partly locked position in that the strip extends radially further outwardly with respect to the center of the circular path in the section of its longitudinal extent adjoining the second abutment section in the opening direction than in the section of its longitudinal extent adjoining the first abutment section in the closing direction such that, in the former section, the strip extends into the movement path of the latch between the unlocked position and the locked position. On an adjustment of the latch from the unlocked position, the latch then already abuts the strip in the partly locked position and may therefore not be adjusted up to and into the locked position. If the second abutment section is formed at a web that projects from the rotary hoop and that, as described further above, has two side surfaces, the strip may extend in the section of its longitudinal extent adjoining the second abutment section in the opening direction, in particular up to a plane that is disposed between the two side surfaces of the web.

The explained restriction of the adjustability of the latch may in particular be expedient when the frame lock comprises a locking device, in particular a lock cylinder, that is received in the lock body, that may be actuated by means of a key associated with the locking device, and that is coupled to the latch, for example via an entrainer, for the adjustment of the latch such that there is a clear relationship (apart from a possible clearance) between a respective rotational position of the key and a respective position of the latch, wherein the key may only be removed from the locking device when it is located in a rotational position corresponding to the locked position of the latch. If the strip does not restrict the adjustability of the latch, the latch may therefore be adjusted into its locked position, and the key may then be removed, both in the locked position and in the open position of the rotary hoop. However, due to said design of the strip that restricts the adjustability of the latch, it may be achieved that—with otherwise the same functionality of the frame lock—the latch may only be adjusted into the locked position in the closed position, but not in the open position of the rotary hoop and the key may therefore only be removed when the rotary hoop is locked by the latch in its closed position. This corresponds to a so-called key retaining function of the frame lock that is specifically in demand in some European countries.

In accordance with this embodiment, the key retaining function may advantageously be achieved by means of the strip, in particular a correspondingly formed structure of the strip, and may thus not have to be implemented by a specific structure of the rotary hoop that possibly impairs the stability of the rotary hoop. The rotary hoop may therefore always be configured in the same manner irrespective of whether a key retaining function is to be present or not, which in particular brings about advantages for the manufacture of the rotary hoop. Depending on the requirements, the key retaining function may or may also not be implemented by arranging a correspondingly formed strip at the rotary hoop. There is generally even the possibility of subsequently providing or removing the key retaining function by replacing the strip.

In this regard, the invention also relates to a frame lock system comprising a frame lock in accordance with the invention that therefore comprises a rotary hoop arrangement comprising a rotary hoop and a strip and that may in particular be configured in one or more of the above-described ways, wherein the strip is configured in the above-mentioned manner to implement a key retaining function, and the frame lock system comprises, in addition to this strip, a further strip that may be selectively arranged at the rotary hoop instead of said strip, wherein the further strip is formed in a section of its longitudinal extent that corresponds to said section adjoining the second abutment section in the opening direction such that said further strip permits the adjustability of the latch from the unlocked position up to and into the locked position. In contrast to said strip, the further strip therefore does not restrict the adjustability of the latch to said partly locked position such that the latch has the same adjustability in the open position of the rotary hoop, in particular may be adjusted up to and into the locked position into which the latch may also be adjusted from its unlocked position in the closed position of the rotary hoop in order to engage behind the respective abutment section and thereby to block the rotary hoop against an adjustment.

In such a frame lock system, it is consequently possible to equip the resulting frame lock with a key retaining function or to omit it, depending on requirements or preferences, by selecting the corresponding strip. The frame lock of the frame lock system may in this respect, at least initially, be present in a still unassembled state such that the preferred version of the strip may be arranged at the rotary hoop immediately on the assembly of the frame lock.

DRAWINGS

The invention will be further explained only by way of example with reference to the Figures in the following:

Figure 2:
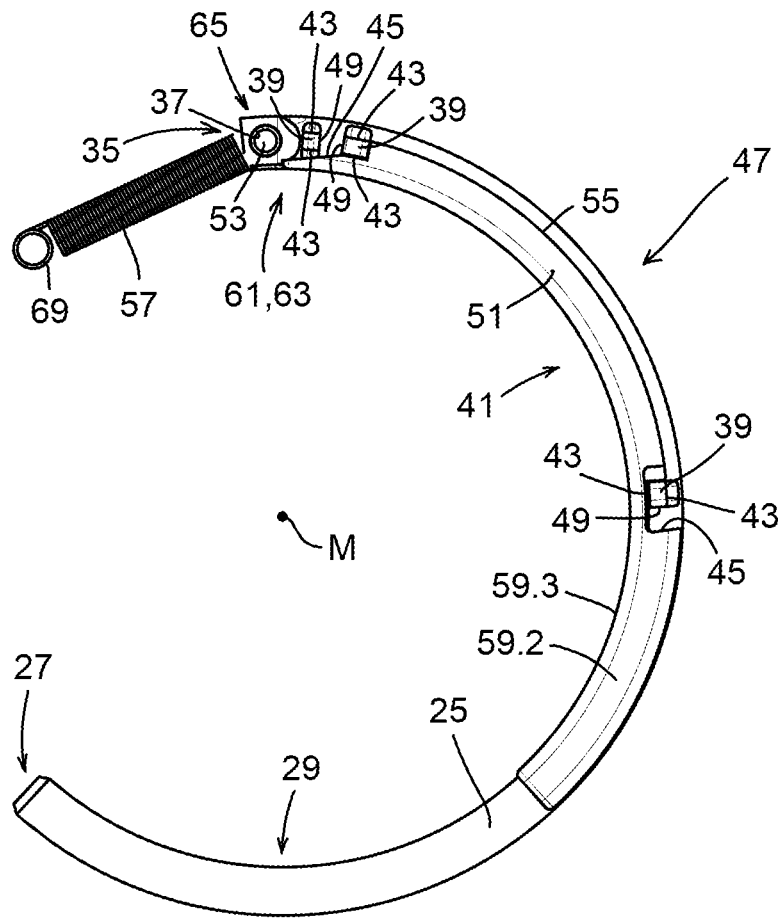
FIG. 2 shows the rotary hoop arrangement of the frame lock together with a spring arranged thereat from an opposite viewing direction in comparison with FIG. 1.
Figure 3:
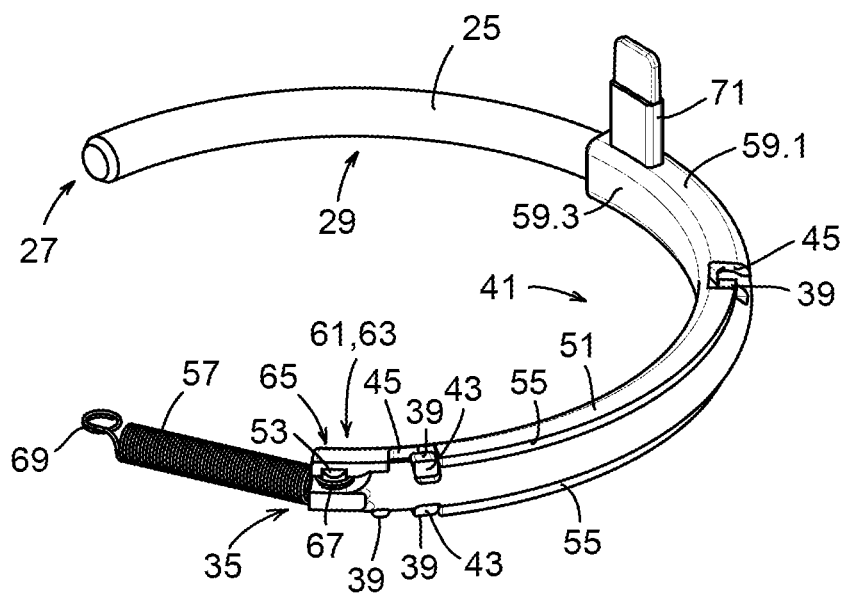
FIG. 3 shows the rotary hoop arrangement from a viewing direction oriented obliquely to the plane of the circular path.
Figure 4:
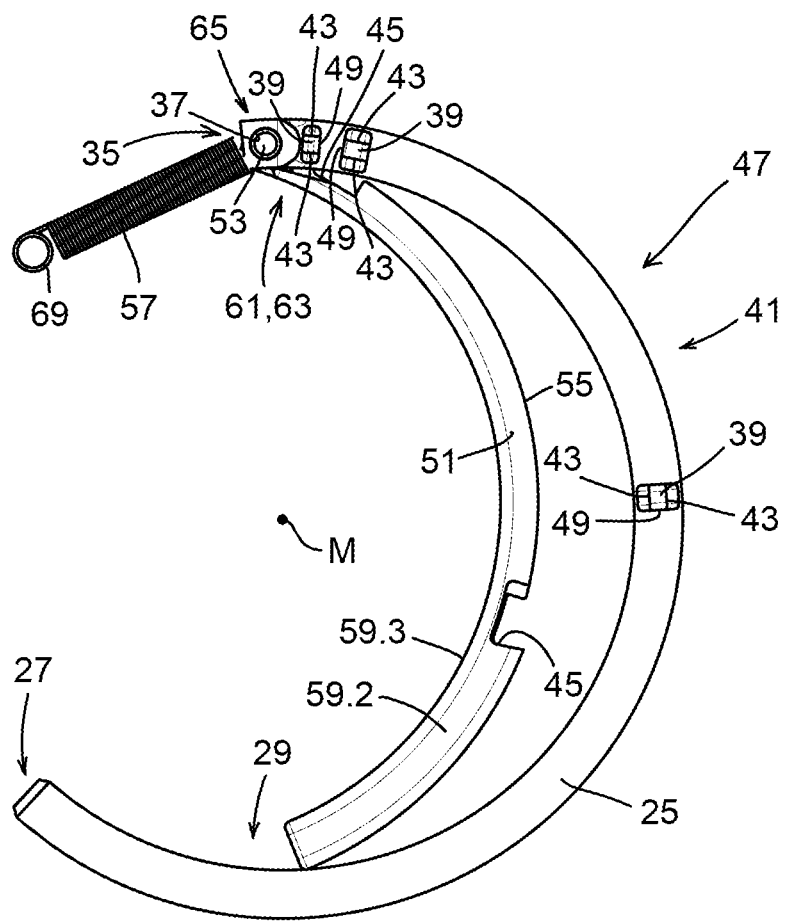
Figure 5:
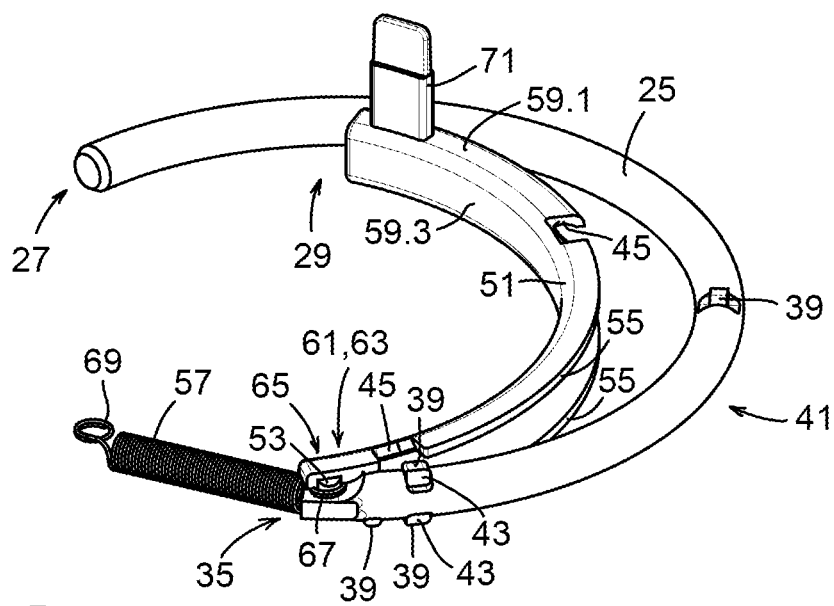
Figure 6:
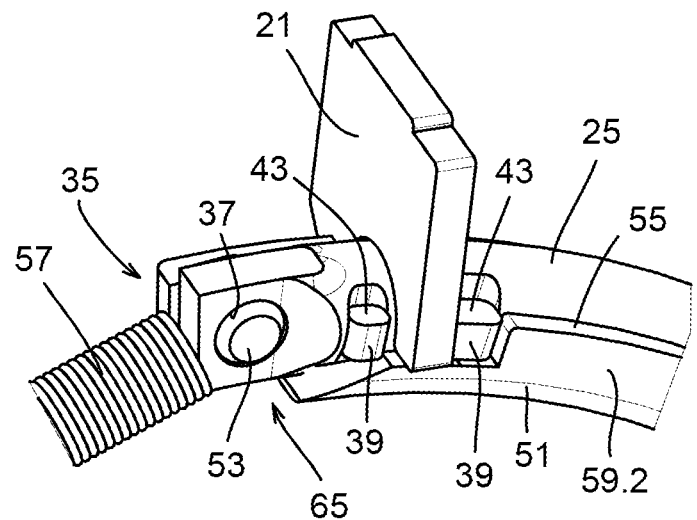
Figure 7:
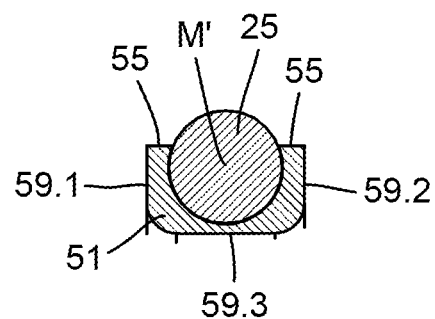

FIG. 4 largely corresponds to FIG. 2, with the strip, however, being pivoted out with respect to the rotary hoop;

FIG. 5 largely corresponds to FIG. 3, with the strip, however, being pivoted out with respect to the rotary hoop;

FIG. 6 shows a detail of the rotary hoop arrangement in cooperation with the latch of the frame lock; and FIG. 7 shows a cross-section of the rotary hoop arrangement perpendicular to the course of the circular path.

DESCRIPTION OF THE INVENTION

Figure 1:
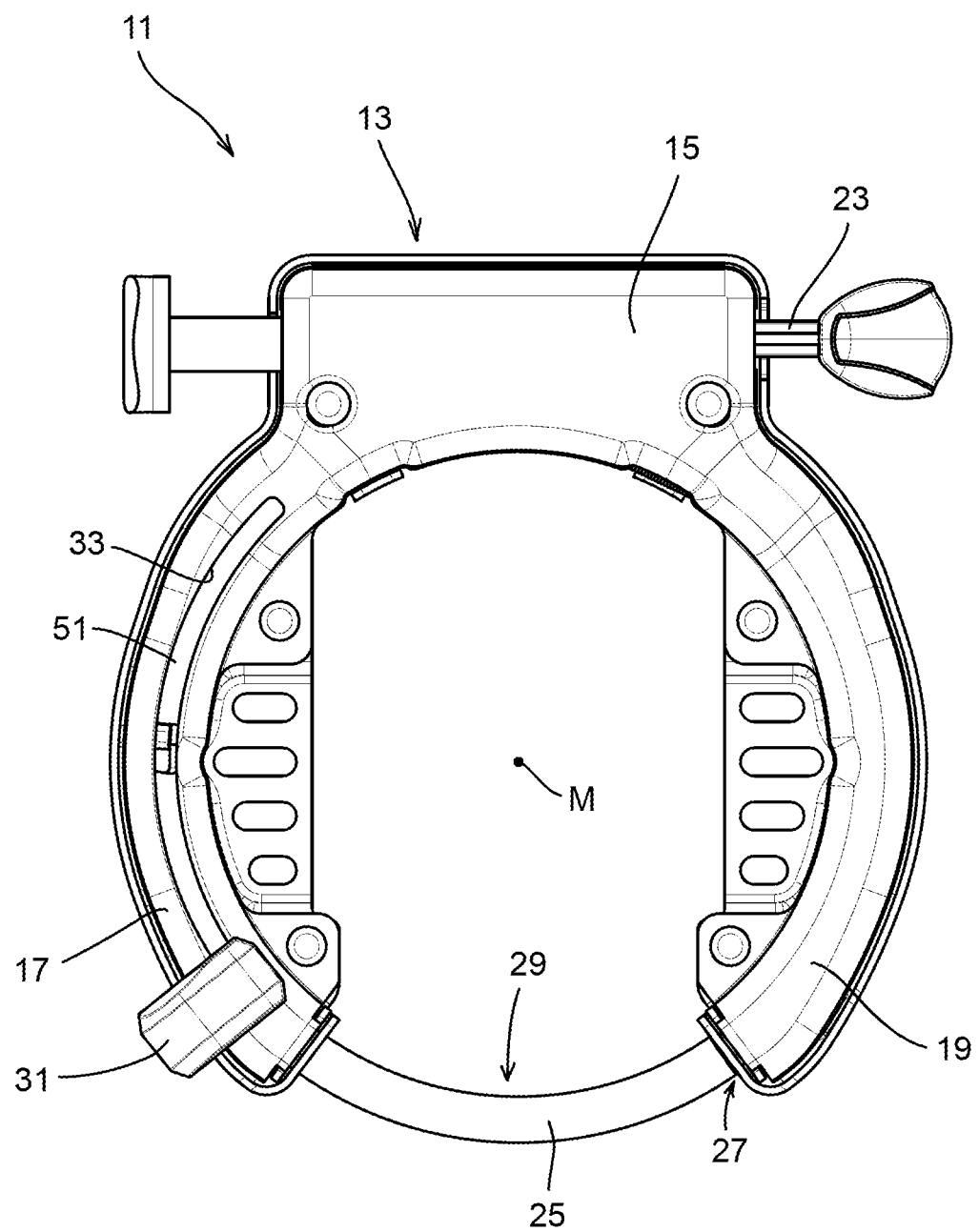
FIG. 1 shows an embodiment of a frame lock in accordance with the invention from a viewing direction perpendicular to the plane of the circular path.

An embodiment of a frame lock 11 in accordance with the invention is shown in FIG. 1. The frame lock 11 comprises a lock body 13 having a housing 15 that is at least substantially C-shaped, wherein a central section of the C shape is widened in a parallelepiped shape and the two remaining sections form a first limb 17 and a second limb 19 of the lock body 13 that extend out of corners of the parallelepiped shape.

A non-visible locking device in the form of a lock cylinder and a latch 21 coupled to the locking device (cf. FIG. 6) are received in the central section. The locking device may only be actuated in a regular manner by means of a key 23 associated with the locking device. The latch 21 is in this respect coupled to the locking device such that it may be adjusted between an unlocked position and a locked position by an actuation of the locking device by means of the key 23. In this respect, there is in particular a clear relationship between the respective position of the latch 21 and the respective rotational position of the key 23.

The frame lock 11 further has a rotary hoop 25 that extends along a circular path and that is at least partly received in the housing 15, namely in a rotary hoop receiver that extends through the first limb 17 and into the parallelepiped-shaped central section of the lock body 13. The rotary hoop 25 is in this respect supported relative to the lock body 13 such that it may be adjusted along its longitudinal extent, that is, along the circular path, between an open position and a closed position. The rotary hoop 25 is composed of metal and sectionally has a constant cross-section that is circular (cf. FIG. 7), but could generally also have another shape, for example that of a regular polygon. The sections that have the constant cross-section in this respect together form a (largely) predominant part, for example over 80%, in particular at least 90%, of the longitudinal extent of the rotary hoop 25.

In the closed position, the rotary hoop 25 projects with a free end 27 out of the first limb 17 and extends up to the second limb 19 and, with the free end 27, extends into the second limb 19 such that it connects the two limbs 17, 19 and the lock body 13 and the rotary hoop 25 thereby form a closed ring. In this way, on a corresponding arrangement of the frame lock 11 at the frame of a two-wheeler (not shown), the rotary hoop 25 may engage through a wheel of the two-wheeler between its spokes and may thus block the wheel against rotation.

In the open position, in contrast, the rotary hoop 25 is at least substantially completely received within the housing 15 or projects only slightly, in particular only with the free end 27, out of the first limb 17 of the housing 15 such that a free space remains between the two limbs 17, 19, within which free space the spokes of the wheel may be moved through between the limbs 17, 19 of the frame lock 11. Thus, in its open position, the rotary hoop 25 releases the wheel of the two-wheeler for a rotation.

The section of the rotary hoop 25 that is arranged outside the housing 15 in the closed position forms a blocking section 29 of the rotary hoop 25 that has said circular cross-section throughout. The blocking section 29 extends along said circular path over an angular range of approximately 60°. The remaining section of the rotary hoop 25, which is always arranged within the housing 15, forms a support section 41 of the rotary hoop 25.

If the rotary hoop 25 is not blocked by the latch 21 against being adjusted, the rotary hoop 25 may be manually displaced by means of a handle 31 from the open position into the closed position and vice versa from the closed position back into the open position along the circular path, which corresponds to a rotation of the rotary hoop 25 about the center M of the circular path. For this purpose, the handle 31 is coupled to the rotary hoop 25 and extends perpendicular to the plane of said circular path, along which the rotary hoop 25 extends, through a slot 33 formed in the first limb 17. The slot 33 in this respect has an arcuate course, wherein the arcuate shape of the slot 33 corresponds to the course of the circular path, in particular is coaxial to the circular path, i.e. has the same center M.

FIG. 1 shows the frame lock 11 from a viewing direction perpendicular to said circular path. In FIGS. 2 and 4, the viewing direction is just the opposite.

FIGS. 2 to 5 show a rotary hoop arrangement 47 of the frame lock 11 that comprises the rotary hoop 25, on the one hand, and a strip 51, on the other hand, together with a spring 57. It can be seen in these Figures that the free end 27 of the rotary hoop 25 has a conical chamfer. With its end opposite thereto, the rotary hoop 25 is fastened to the spring 57 and is fastened via the spring 57 to the lock body 13. In this regard, this end forms a coupled end 35 of the rotary hoop 25.

At the coupled end 35, the rotary hoop 25 is flattened at both sides perpendicular to the plane of the circular path and has, inter alia for coupling to the lock body 13, a hole 37 extending perpendicular to the plane of the circular path through the rotary hoop 25.

To be able to be blocked by the latch 21 against an adjustment between the open position and the closed position, the rotary hoop 25 has a blocking structure that comprises a plurality of webs 39. Each of these webs 39 at least partly projects perpendicular to the plane of the circular path from the rotary hoop 25. In this respect, the webs 39 in particular each project over said circular cross-section which is shown in FIG. 7 and which in particular sections of the rotary hoop 25 adjoining the respective web 39 along the circular path have. The webs 39 extend outwardly beyond an outer contour of this cross-section.

The webs 39 each have two mutually opposite parallel side surfaces 43 that are oriented facing radially outwardly or inwardly with respect to the center M of the circular path and that consequently extend substantially tangentially to the circular path. Furthermore, the webs 39 each have an abutment section 49 that is formed by an end face of the respective web 39 that connects the two side surfaces 43 and that is oriented at least substantially perpendicular to the course of the circular path (cf. also FIG. 6).

The latch 21 and the rotary hoop 25 are arranged relative to one another such that, in its locked position, the latch 21 is at least partly located in the movement path of the webs 39 which the webs 39 would pass through unhindered on an adjustment of the rotary hoop 25 along the circular path. When the rotary hoop 25 is in its closed position or its open position and the latch 21 is in its locked position, the latch 21 thereby engages behind the abutment section 49 of the respective web 39 that is closest with respect to the adjustment direction. When the rotary hoop 25 is adjusted in the corresponding direction, this abutment section 49 consequently contacts the latch 21 such that the rotary hoop 25 is thereby blocked against a further adjustment in this direction. In the detailed representation of FIG. 6, this is shown by way of example for the state in which the rotary hoop 25 is in its closed position and the latch 21 is in its locked position.

The strip 51 of the rotary hoop arrangement 47 arranged at the rotary hoop 25 extends along the circular path like the rotary hoop 25 and therefore, similarly to the rotary hoop 25, at least substantially has an arcuate shape. The strip 51, which is formed as an inherently stable part composed of plastic, is in this respect shaped and arranged at the rotary hoop 25 such that it covers the rotary hoop 25 along a part of its longitudinal extent and a part of its periphery (in the peripheral direction around the course of the circular path). The strip 51 areally contacts the rotary hoop 25 where it covers the rotary hoop 25.

The strip 51 engages with a pin 53 formed at the strip 51 into the hole 37 at the coupled end 35 of the rotary hoop 25 and extends from there over more than half of the longitudinal extent of the rotary hoop 25, namely at least substantially over the total support section 41.

The spring 57 is also fastened to the pin 53 that engages into the hole 37. For this purpose, the spring 53 has an eyelet 67 at one end through which the pin 53 engages before it engages into the hole 37. In this way, the spring 53 is captured between the rotary hoop 25 and the strip 51 (cf. FIGS. 3 and 5). At the end opposite the eyelet 67, the spring 53 has a further eyelet 69 via which it is coupled to the lock body 13.

A fastening lug 71 is integrally formed at the strip 51 and projects perpendicular to the plane of the circular path from the strip 51 (see FIGS. 3 and 5). The fastening lug 71 serves for the fastening of the handle 31 to the strip 51. The handle 31 is thereby coupled to the rotary hoop 25 via the strip 51 such that the strip 51 acts as a "connector" in this regard. In this way, the handle 31 or the fastening lug 71 in particular does not need to be provided directly at the rotary hoop 25.

The strip 51 has a constant cross-section over a large part of its longitudinal extent (cf. FIG. 7). The strip 51 in particular has this constant cross-section between the abutment sections 49 of the webs 39 that correspond to the closed position or the open position of the rotary hoop 25 and that are consequently engaged behind when the rotary hoop 25 is in its closed position or its open position and the latch 21 is in its locked position.

As can be seen in FIG. 7, the strip 51 extends—at least in those sections of its longitudinal extent in which it has said constant cross-section—in the peripheral direction around the rotary hoop 25 (that is around the course of the circular path) over more than half of the periphery of the rotary hoop 25. With respect to a center M' of the cross-section of the rotary hoop 25 that corresponds to a center of area of this cross-section, the strip 51 extends in the peripheral direction around the rotary hoop 25 over an angular range of approximately 225°. In this respect, the strip 51 areally contacts the outer contour of the cross-section of the rotary hoop 25, that is along the longitudinal extent of the rotary hoop at its surface. For this purpose, the cross-section of the strip 51 has an inner contour that is complementary to the cross-section of the rotary hoop 25 and that, in the example shown, has an arcuate shape due to the circular shape of the cross-section of the rotary hoop 25.

Due to said extent of the strip 51 in the peripheral direction around the rotary hoop 25, the strip 51 has a C-shaped cross-section with which the strip 51 covers the rotary hoop 25 with respect to three directions that are radial with respect to said center M' of the cross-section of the rotary hoop 25 and that each differ by 90° in their orientation. Specifically, the strip 51 in this respect covers the rotary hoop 25 both in a direction perpendicular to the plane of the circular path and in a direction opposite thereto (to the left or the right in FIG. 7) as well as in a direction facing the center M of the circular path, i.e. facing radially inwardly (downwardly in FIG. 7). With respect to the plane of the circular path, the cross-section is mirror-symmetrical in this respect.

The cross-section of the strip 51 is flattened outwardly with respect to said three directions. The strip 51 thereby has three outer sides 59 that are each areal. A first outer side 59.1 and a second outer side 59.2 are aligned in parallel with one another and with the plane of the circular path (i.e. are each disposed in a plane in parallel with the plane of the circular path) and bound the strip 51 in opposite directions perpendicular to the plane of the circular path. A third outer side 59.3 is oriented perpendicular to the plane of the circular path (i.e. has the shape of a circular band or a cylinder jacket shape) and bounds the strip 51 in a direction that is radial with respect to the center M of the circular path, namely radially inwardly in the example shown. In this way, the outer sides 59 of the strip 51 may slide along correspondingly oriented areal inner walls of the rotary hoop receiver such that the total rotary hoop arrangement 47 is reliably guided.

In the peripheral direction around the rotary hoop 25, the cross-section of the strip 51 is bounded by two side surfaces 55 that face radially outwardly with respect to the center M of the circular path. The side surfaces 55 extend along the circular path, in each case from a web 39 corresponding to the closed position of the rotary hoop 25 up to a web 39 corresponding to the open position of the rotary hoop 25 and are in this respect aligned with the two side surfaces 43 of these two webs 39 facing radially outwardly with respect to the center M of the circular path. The respective three side surfaces 49, 55 thereby form a substantially continuous path which the latch 21 may contact and slide along while the rotary hoop 25 is adjusted from its open position into the closed position or from its closed position into the open position.

Due to the engagement around of the rotary hoop 25 over more than half of its periphery, the strip 51 is fastened in a form-fitting manner to the rotary hoop 25 in a direction that is radial with respect to the center M of the circular path. In this respect, the strip 51 has an elasticity that allows it to overcome this form fit. The strip 51 may thereby be fastened in a latching manner to the rotary hoop 25 or may be released from it again.

An end section 61 of the rotary hoop 25, in which said hole 37 is formed, and a mutually corresponding end section 63 of the strip 51, in which the pin 53 is formed, form a pivot connection 65 that, due to the cooperation of the pin 53 and the hole 37, makes it possible that the strip 51 may be pivoted relative to the rotary hoop 25 about the longitudinal axis of the pin 53 that corresponds to the cylinder axis of the cylindrical shape of the pin 53.

For the arrangement of the strip 51 at the rotary hoop 25 during the assembly of the rotary hoop arrangement 47 (or of the total frame lock 11), the strip 51 may therefore first be inserted with its pin 53 into the hole 37 of the rotary hoop 25 such that said pivot connection 65 is formed and the strip 51 adopts the position shown in FIGS. 4 and 5 relative to the rotary hoop 25. From this position, the strip 51 may then be pivoted radially from the inside to the outside against the rotary hoop 25 with respect to the center M of the circular path until it adopts the position shown in FIGS. 2 and 3 in which it areally contacts said rotary hoop 25 and engages around in the sections that have said constant cross-section (cf. FIG. 7). Shortly before reaching this position, the limbs of the C shape of the cross-section of the strip 51 are in this respect temporarily widened such that the strip 51 snaps in at the rotary hoop 25 and the form fit is thereby brought about in a latching manner in the radial direction.

An additional form fit between the strip 51 and the rotary hoop 25 in the direction along the circular path also results from the strip 51 arranged at the rotary hoop 25 extending along the circular path between the webs 39 comprising the abutment sections 49 that correspond to the closed position or to the open position of the rotary hoop 25. In this respect, the strip 51 extends at both sides of the rotary hoop 25 that are opposite with respect to the plane of the circular path, in each case from a web 39 corresponding to the closed position along an outer contour of the rotary hoop 25, which follows the course of the circular path, up to a web 39 that projects in the same direction and that corresponds to the open position. At a corresponding point along its longitudinal extent, the strip 51 for this purpose has cut-outs 45 which correspond to these webs 39 and due to which the strip 51 extends less far in the peripheral direction around the rotary hoop 25 than in a section of the longitudinal extent of said strip 51 having said constant cross-section, in particular than in the section between said webs 39 corresponding to the closed position or the open position. Due to the engagement of the webs 39 into these cut-outs 45, the strip 51 is captured between these webs 39 and is thus also fastened in a form-fitting manner to the rotary hoop 25 along the circular path. In addition to said webs 39 and cut-outs 45, even further elevated portions or recesses may be formed at the rotary hoop 25 and the strip 51, a form fit being formed between the rotary hoop 25 and the strip 51 with respect to the course of the circular path due to the engagement of said further elevated portions or recesses into one another.

The cut-outs 45 extend along the circular path not only over the length of the respective web 39, but also beyond it at the side of the respective abutment section 49 such that a free space is provided there in which the latch 21 may engage behind the abutment section 49. In deviation from the embodiment shown in the Figures, the cut-outs 45, into which a web 39 corresponding to the open position engages, may be smaller in the region adjoining the abutment section 49 than shown, namely in that the strip 51 extends radially further outwardly in this region with respect to the center M of the circular path than shown, in particular up to approximately centrally between the two side surfaces 43 of this web 39. When the rotary hoop 25 is in its open position, the strip 51 may thereby restrict the adjustability of the latch 21 to an adjustment between the unlocked position and a partly locked position, wherein the partly locked position is disposed between the unlocked position and the locked position. A key retaining function may thereby be implemented in which the key 23 may not be removed from the lock body 13 in the open position of the rotary hoop since the latch 21 may not be adjusted into the locked position and the key 23 may thus also not be adjusted into a corresponding rotational position that allows a removal.

In the frame lock 11, a strip 51 formed in this alternative manner may also be provided in addition to the strip 51 shown, whereby a frame lock system is then formed in which the one or the other strip 51 may be selectively arranged at the rotary hoop 25 to selectively implement, as required, said key retaining function.

The invention claimed is:

1. A frame lock for a two-wheeler, said frame lock comprising:
   a lock body that comprises a latch, and
   a rotary hoop arrangement that comprises a rotary hoop and a strip,
   wherein the rotary hoop extends along a circular path, is at least partly received in a rotary hoop receiver of the lock body, and is adjustable relative to the lock body along the circular path between an open position, in which the rotary hoop releases a wheel of the two-wheeler for a rotation, and a closed position in which the rotary hoop blocks the wheel against rotation,
   wherein the rotary hoop has a blocking structure comprising an abutment section,
   wherein the latch is adjustable between an unlocked position and a locked position,
   wherein, when the rotary hoop is in its closed position and the latch is in its locked position, the latch engages behind the abutment section and thereby blocks the rotary hoop against an adjustment into the open position,
   wherein the strip is arranged at the rotary hoop such that, on an adjustment of the rotary hoop, the strip moves together with the rotary hoop and outer sides of the strip slide along inner side walls of the rotary hoop receiver,
   wherein the strip extends along the circular path, and is configured such that the strip covers the rotary hoop along at least a part of its longitudinal extent and at least a part of its periphery, and
   wherein the strip extends over more than 180° in a peripheral direction around the rotary hoop.

2. The frame lock in accordance with claim 1, wherein the strip covers the rotary hoop at least regionally in a direction perpendicular to a plane of the circular path, at least regionally in a direction opposite thereto, and at least regionally in a direction facing a center of the circular path or facing away therefrom.

3. The frame lock in accordance with claim 1, wherein the strip contacts the rotary hoop along a longitudinal extent of the strip.

4. The frame lock in accordance with claim 1, wherein the strip is formed as a dimensionally stable and/or elastic part separate from the rotary hoop.

5. The frame lock in accordance with claim 1, wherein the strip is fastened in a form-fitting manner to the rotary hoop.

6. The frame lock in accordance with claim 1, wherein the strip is fastened in a latching manner to the rotary hoop.

7. The frame lock in accordance with claim 1, wherein an end section of the rotary hoop and a corresponding end section of the strip form a pivot connection that has a pin that extends along a longitudinal axis perpendicular to the plane of the circular path, and wherein the strip is pivotable about the longitudinal axis of the pin relative to the rotary hoop.

8. The frame lock in accordance with claim 1, wherein the strip has a handle for manually adjusting the rotary hoop or a fastening lug for fastening such a handle to the strip, and wherein the handle or the fastening lug either projects radially outwardly with respect to the center of the circular path from the strip or projects perpendicular to the plane of the circular path from the strip.

9. The frame lock in accordance with claim 1, wherein the rotary hoop has at least one elevated portion along its longitudinal extent, the elevated portion engaging into a recess of the strip such that a form fit is formed between the strip and the rotary hoop with respect to a course of the circular path.

10. The frame lock in accordance with claim 1, wherein the blocking structure comprises at least two abutment sections that correspond to the closed position and the open position of the rotary hoop, wherein, when the rotary hoop is in its closed position or its open position and the latch is in its locked position, the latch engages behind the corresponding abutment section and thereby blocks the rotary hoop against an adjustment from the respective position, and wherein the strip extends along the circular path at least between the two abutment sections.

11. The frame lock in accordance with claim 10, wherein the blocking structure comprises at least two webs projecting from the rotary hoop, wherein each of the two webs has one of the two abutment sections and two mutually opposite parallel side surfaces that extend at least substantially along the circular path, wherein the abutment section of the respective web is formed by an end face of the web that connects the side surfaces of the web and that is oriented at least substantially perpendicular to the circular path, and wherein the strip has a side surface that is at least substantially aligned both with one of the side surfaces of the one of the two webs and with one of the side surfaces of the other of the two webs.

12. The frame lock in accordance with claim 1, wherein the blocking structure has at least a first abutment section facing in a closing direction and a second abutment section facing in an opening direction opposite the closing direction, wherein, when the rotary hoop is in its closed position and the latch is in its locked position, the latch engages behind the first abutment section and thereby blocks the rotary hoop against an adjustment into the open position, wherein, when the rotary hoop is in its open position and the latch is in a partly locked position between the locked position and the unlocked position, the latch engages behind the second abutment section and thereby blocks the rotary hoop against an adjustment into the closed position, and wherein the strip is formed in a section of its longitudinal extent adjoining the second abutment section in the opening direction such that said strip restricts the adjustability of the latch to an adjustment between the unlocked position and the partly locked position.

13. The frame lock in accordance with claim 1, wherein the rotary hoop is composed of metal and the strip is composed of plastic.

14. The frame lock in accordance with claim 1, wherein the strip extends over at least 210° in the peripheral direction around the rotary hoop.

15. A frame lock system comprising the frame lock in accordance with claim 12 and a further strip that can be selectively arranged at the rotary hoop instead of the strip, wherein the further strip is formed in a section of its longitudinal extent that corresponds to the section adjoining the second abutment section in the opening direction such that the further strip permits the adjustability of the latch from the unlocked position up to and into the locked position.

16. A frame lock for a two-wheeler, said frame lock comprising:
a lock body that comprises a latch, and
a rotary hoop arrangement that comprises a rotary hoop and a strip,
wherein the rotary hoop extends along a circular path and is adjustable relative to the lock body along the circular path between an open position, in which the rotary hoop releases a wheel of the two-wheeler for a rotation, and a closed position in which the rotary hoop blocks the wheel against rotation,
wherein the rotary hoop has a blocking structure comprising an abutment section,
wherein the latch is adjustable between an unlocked position and a locked position,
wherein, when the rotary hoop is in its closed position and the latch is in its locked position, the latch engages behind the abutment section and thereby blocks the rotary hoop against an adjustment into the open position,
wherein the strip is arranged at the rotary hoop such that the strip moves together with the rotary hoop on an adjustment of the rotary hoop,
wherein the strip extends along the circular path, and is configured such that the strip covers the rotary hoop along at least a part of its longitudinal extent and at least a part of its periphery,
wherein the strip extends over more than 180° in a peripheral direction around the rotary hoop;
wherein the strip covers the rotary hoop at least regionally in a direction perpendicular to a plane of the circular path, at least regionally in a direction opposite thereto, and at least regionally in a direction facing a center of the circular path or facing away therefrom.

17. A frame lock for a two-wheeler, said frame lock comprising:
a lock body that comprises a latch, and
a rotary hoop arrangement that comprises a rotary hoop and a strip,
wherein the rotary hoop extends along a circular path and is adjustable relative to the lock body along the circular path between an open position, in which the rotary hoop releases a wheel of the two-wheeler for a rotation, and a closed position in which the rotary hoop blocks the wheel against rotation,
wherein the rotary hoop has a blocking structure comprising an abutment section,
wherein the latch is adjustable between an unlocked position and a locked position,
wherein, when the rotary hoop is in its closed position and the latch is in its locked position, the latch engages behind the abutment section and thereby blocks the rotary hoop against an adjustment into the open position,
wherein the strip is arranged at the rotary hoop, extends along the circular path, and is configured such that the strip covers the rotary hoop along at least a part of its longitudinal extent and at least a part of its periphery,
wherein the strip extends over more than 180° in a peripheral direction around the rotary hoop,
wherein an end section of the rotary hoop and a corresponding end section of the strip form a pivot connection that has a pin that extends along a longitudinal axis perpendicular to the plane of the circular path, and
wherein the strip is pivotable about the longitudinal axis of the pin relative to the rotary hoop.

18. The frame lock in accordance with claim 17, wherein the strip is fastened in at least one of a form fit or a latching connection to the rotary hoop, wherein the at least one of a form fit or a latching connection between the strip and the rotary hoop can be brought about by pivoting the strip about the longitudinal axis of the pin towards the rotary hoop.

19. The frame lock in accordance with claim 17, wherein a hole is formed in the end section of the rotary hoop and the pin is formed at the corresponding end section of the strip and engages into the hole.

20. The frame lock in accordance with claim 17, wherein the frame lock further comprises a spring for preloading the rotary hoop relative to the lock body, and wherein the spring is fastened to the pin.

21. The frame lock in accordance with claim 20, wherein the spring is fastened to the pin by an eyelet formed at one end of the spring.

* * * * *